US 6,951,912 B2
Oct. 4, 2005

(12) United States Patent
Scheim et al.

(54) MASSES WHICH MAY BE CROSS-LINKED TO GIVE ELASTOMERS WITH CLEAVAGE OF ALCOHOLS FROM ALKOXYSILYL END GROUPS

(75) Inventors: Uwe Scheim, Coswig (DE); Gabriele Dineiger, Meissen (DE); Wolfgang Ziche, Diera (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/471,969

(22) PCT Filed: Mar. 7, 2002

(86) PCT No.: PCT/EP02/02528

§ 371 (c)(1),
(2), (4) Date: Sep. 15, 2003

(87) PCT Pub. No.: WO02/090431

PCT Pub. Date: Nov. 14, 2002

(65) Prior Publication Data

US 2004/0082462 A1 Apr. 29, 2004

(30) Foreign Application Priority Data

May 3, 2001 (DE) .......................................... 101 21 514

(51) Int. Cl.$^7$ ............................................. C08G 77/16
(52) U.S. Cl. .......................... 528/18; 528/23; 528/901; 502/155; 502/152
(58) Field of Search ................................ 502/155, 152; 528/18, 23, 901

(56) References Cited

U.S. PATENT DOCUMENTS

| 3,525,778 A | 8/1970 | Lengnick |
| 5,674,936 A | 10/1997 | Lucas |
| 6,162,756 A | 12/2000 | Friebe et al. |

FOREIGN PATENT DOCUMENTS

| EP | 0 069 256 | 1/1983 |

*Primary Examiner*—Kuo-Liang Peng
(74) *Attorney, Agent, or Firm*—Brooks Kushman P.C.

(57) ABSTRACT

Storage stability of one-component elastomers prepared from constituents having alkoxysilyl end groups is enhanced by employing bin compounds having a coordination number of 5 or 6 in which tin is coordinately bonded to a P=O group as at least one condensation catalyst.

11 Claims, No Drawings

MASSES WHICH MAY BE CROSS-LINKED TO GIVE ELASTOMERS WITH CLEAVAGE OF ALCOHOLS FROM ALKOXYSILYL END GROUPS

CROSS-REFERENCE TO RELATED APPLICATION

This application claims priority to PCT Appln. No. PCT/EP02/02528; filed Mar. 7, 2002, and to German application 101 21 514.2 filed May 3, 2001.

BACKGROUND OF THE INVENTION

1. Field of the Invention

The invention relates to compositions which are crosslinkable with elimination of alcohols from alkoxysilyl end groups to give elastomers, and which comprise a tin catalyst comprising a tin compound (T) having a coordination number of 5 or 6.

2. Description of the Related Art

Compositions crosslinkable with elimination of alcohols from alkoxysilyl end groups to give elastomers, for example single-component organopolysiloxane compositions crosslinkable with elimination of alcohols to give elastomers (RTV1 alkoxy compositions), need catalysts for the crosslinking process.

The use of dialkyltin(IV) compounds as condensation catalysts in RTV1 and RTV2 silicone rubbers is well known. However, in RTV1 alkoxy compositions these tin compounds have the disadvantage that they likewise catalyze an undesired cleavage of the siloxane chains by traces of alcohol (equilibration). These small amounts of alcohol arise during the compounding process through hydrolysis of the alkoxysilanes used as crosslinking agents, by water entrained by the raw materials. The equilibration process produces monoalkoxy end groups on the polysiloxane chain, and these can no longer be crosslinked. The result is prevention of adequate crosslinking of the composition, with the result that correct use of the material either does not give a vulcanizate or at least gives a vulcanizate with inadequate mechanical stability. The equilibration process drastically reduces storage stability, stated in terms of the period for which the RTV1 alkoxy composition can be stored without discernible loss of its properties.

Similar problems are also found with other systems crosslinkable with elimination of alcohols to give elastomers, for example with polyethers having alkoxysilyl end groups. Here again, the dialkyltin(IV) compounds used as condensation catalysts cause storage stability problems, which are suppressed by a particularly inconvenient preparation process, for example baking the polymer/filler mixtures in vacuo for some hours.

Various methods have been developed to improve storage stability in RTV1 alkoxy compositions. As a first example, EP-A-69 256 attempts to eliminate the traces of alcohol by adding compounds which react irreversibly with the alcohol. These compounds are termed scavengers.

Furthermore, attempts have also been made to prepare scavenger-free mixtures. The titanium catalysts or zirconium catalysts described in U.S. Pat. No. 5,674,936 are particularly suitable for this purpose. However, a decisive disadvantage associated with these catalysts is that they either have a strong tendency toward yellowing or indeed have a yellow intrinsic color. This prevents the preparation of transparent, colorless RTV1 mixtures. However, it is specifically these mixtures which are most in demand, because they have universal application.

The use of compounds having Sn—O—P bonds, obtained from diesters of phosphoric acid, is also known, for example from U.S. Pat. No. 3,525,778. However, the tin catalysts known from the literature give rise to the polymer degradation reactions described above when they are used in polysiloxane compositions. This is seen, for example, in the loss, or retarding, of the crosslinkability of RTV1 products.

A further improvement is provided by the use, described in U.S. Pat. No. 6,162,756, of catalysts having Sn—O—P bonds, obtained by reaction of monoesters of phosphoric acid with organic tin compounds. However, it has been found that the very high acid number of the phosphorus compounds used, resulting from the restriction of the invention to the use of monoesters of phosphoric acid, which have to be used at least in amounts equimolar with the tin compound, or in excess, causes problems with storage stability and adhesion problems, these being particularly evident when the adhesive bonds are aged in water.

SUMMARY OF THE INVENTION

The invention is based on the object of providing catalysts for compositions which have good storage stability, which need no scavenger, and which are crosslinkable with elimination of alcohols from alkoxysilyl end groups to give elastomers. These and other objects are obtained by employing a tin catalyst with a coordination number of 5 or 6, in which tin is coordinately bonded to a P=O group.

DESCRIPTION OF THE PREFERRED EMBODIMENT

The invention provides compositions which are crosslinkable with elimination of alcohols from alkoxysilyl end groups to give elastomers, and which comprise a tin catalyst (T) is a tin compound (T) having a coordination number of 5 or 6, in which the tin atom has coordinate bonding to the P=O group of a phosphorus compound having a P=O group, the tin compound (T) being obtainable via reaction of a phosphorus compound having a P=O group and selected from compounds of the general formula (I):

$$O=PR^1_m(OR^2)_n(OH)_{3-m-n} \qquad (I),$$

where
n is 2 or 3, if m is 0, and
n is 0, 1, or 2, if m is 1, 2, or 3,
m+n is 1, 2, or 3,
$R^1$ and $R^2$ are $C_1$–$C_{30}$-hydrocarbon radicals optionally substituted by hydroxy, halogen, or cyano radicals, or radicals of the general formula (II):

$$[(CR^3_2)_b-O]_c(CR^4_2)_d-L-M \qquad (II),$$

where
$R^3$ and $R^4$ are a hydrogen radical, methyl radical, or hydroxy radical,
b and d are 2 or 3,
c is an integer from 1 to 15,
L is a radical from the group —O—, —COO—, —OOC—, —CONR$^5$—, —NR$^6$CO—, and —CO—,
$R^5$ and $R^6$ are a hydrogen radical or a $C_1$–$C_{10}$-alkyl radical, and
M is a monovalent $C_1$–$C_{20}$-hydrocarbon radical, optionally substituted with hydroxy, fluoro, chloro, bromo, $C_1$–$C_{10}$-alkoxyalkyl, or cyano groups, with the proviso that on each carbon atom only one of the radicals $R^3$ and $R^4$ may be a hydroxy radical, compounds of the general formula (III):

$$O=PR^7{}_o(NR^8{}_2)_p(OR^9)_{3-o-p} \quad (III),$$

where
$R^7$ is as defined for $R^1$,
$R^8$ is as defined for $R^1$, where it is also possible for the two radicals $R^8$ to be bonded to one another,
$R^9$ is as defined for $R^1$, or is hydrogen,
o is 0, 1, or 2,
p is 1, 2, or 3, and
o+p is 1, 2, or 3, and condensates or hydrolysates of compounds of the general formulae (I) and (III) having one or more P—O—P bonds;

with an organic tin compound which is selected from a compound of the general formula (IV):

$$R^{10}{}_{4-r}SnX_r \quad (IV),$$

a compound of the general formula (V):

$$R^{10}{}_2SnY \quad (V),$$

a compound of the general formula (VI):

$$R^{10}{}_3SnY_{1/2} \quad (VI),$$

and a compound of the general formula (VII):

$$R^{10}SnY_{3/2} \quad (VII),$$

where
$R^{10}$ is a $C_1$–$C_{30}$-hydrocarbon radical, optionally substituted by halogen radicals or by cyano radicals,
X is halo, —OH, —$OR^{10}$, —$SR^{10}$, —$OOCR^{10}$, —$NR^{10}$, —$NHR^{10}$, —$OSiR^{10}{}_3$ or —$OSi(OR^{10})_3$,
Y is O or S, and
r is 1, 2, or 3.

The compositions crosslinkable to give elastomers have good storage stability.

In the tin compound (T), the tin atom has coordinate bonding to the phosphorus compound having the P=O group. A covalent bond between the phosphorus compound and the tin atom is not a requirement, but may be present. The result is that the tin compound (T) remains capable of catalyzing the condensation reaction at the alkoxysilyl end groups. However, at the same time the alcohol present in the compositions is is not sufficiently activated to enter into disruptive reactions which could reduce storage stability.

The phosphorus compound used of the general formula (i) are, for example tributyl phosphate, tris(butoxyethyl) phosphate, tris(lauryltriethylene glycol) phosphate, triphenylphosphine oxide, bis(aryl or alkyl) hydoxymethylphosphonic acid, or phenylphosphonic acid. Preference is given to the triesters of orthophosphoric acid. Examples of a phosphorus compound used of the general formula (III) are, by way of example, hexamethylphosphoramide or tripiperidinophosphine oxide.

Examples of the organic tin compounds of the general formulae (IV) to (VII) are DBTA, DBTL, or reaction products of DBTA, DBTL, and/or DBTO with alkoxysilanes, and it is also possible for the conversion of the materials to begin only when they are in situ in the crosslinkable composition.

The tin catalyst may be prepared by reaction of the phosphorus compound selected from compounds of the general formulae (I) and (III), with an organic tin compound selected from a compound of the general formula (IV) to (VII), prior to addition to the crosslinkable composition, or only after addition to the composition.

The crosslinkable compositions are any desired compositions which are crosslinkable with elimination of alcohols from alkoxysilyl end groups to give elastomers. Examples of these are compositions based on compounds having alkoxysilyl end groups, these being organopolysiloxanes, polyethers, polyesters, polyurethanes, polyureas, and copolymers of organopolysiloxanes, polyethers, polyesters, polyurethanes, and polyureas. Preference is given to crosslinkable organopolysiloxane compositions, in particular single-component organopolysiloxane compositions (RTV1 alkoxy compositions).

The use of the tin catalysts (T) improves the adhesion to various substrates of the single-component crosslinkable organopolysiloxane compositions (RTV1 alkoxy compositions).

RTV1 alkoxy compositions preferably comprise organopolysiloxane(s) (A) terminated by alkoxy groups, in particular linear diorganosiloxanes of the general formula (VIII)

$$R^{11}{}_f(R^{12}O)_{3-f}Si—(O—SiR_2)_g—O—SiR^{11}{}_f(OR^{12})_{3-f} \quad (VIII),$$

where
each of R, $R^{11}$ and $R^{12}$ is a monovalent $C_1$–$C_8$-hydrocarbon radical, optionally substituted with fluoro, chloro, bromo, $C_1$–$C_4$-alkoxyalkyl, or cyano groups,
f is 0 or 1, and
g has values corresponding to a viscosity of from 0.05 to 1000 Pa.s for the organopolysiloxane (A).

Preferred radicals R, $R^{11}$, and $R^{12}$ are unsubstituted $C_1$–$C_4$-alkyl radicals, the methyl radical being particularly preferred.

The viscosity of the organopolysiloxane (A) is preferably from 100 to 70,000 mPa.s, in particular from 20,000 to 350,000 mPa.s, in each case measured at 23° C.

The RTV1 alkoxy compositions preferably also comprise at least 35% by weight, in particular at least 45% by weight, and preferably at most 80% by weight, in particular at most 70% by weight, of organopolysiloxane (A).

The the RTV1 alkoxy compositions preferably comprise alkoxysilanes (B), which in particular have the general formula (IX):

$$R^{13}{}_\mu Si(OR^{14})_{4-\mu} \quad (IX),$$

where
$R^{13}$ and $R^{14}$ are monovalent $C_1$–$C_{13}$-hydrocarbon radicals, optionally substituted with fluoro, chloro, bromo, $C_1$–$C_4$-alkoxy alkoxyalkyl, or cyano groups, and
$\mu$ is 0 or 1.

Partial hydrolysates of alkoxysilane (B), arising via hydrolysis and condensation of, in particular, from 2 to 4 alkoxysilanes may also be present. Examples of partial hydrolyzates (B) are hexamethoxydisiloxane and hexaethoxydisiloxane.

$R^{13}$ are preferably unsubstituted $C_1$–$C_6$-hydrocarbon radicals, in particular methyl, ethyl, and propyl radicals.

$R^{14}$ are preferably unsubstituted $C_1$–$C_6$-hydrocarbon radicals, in particular methyl, ethyl, vinyl, and propyl radicals.

The RTV1 alkoxy compositions preferably comprise at least 0.01% by weight, in particular at least 0.1% by weight, and preferably at most 3% by weight, in particular at most 1% by weight, of tin catalyst (T).

In addition to the abovementioned components, the RTV1 alkoxy compositions may comprise other components known per se, such as crosslinking agents, fillers, pigments, soluble dyes, fragrances, plasticizers, fungicides, resin-like organopolysiloxanes, including those composed of $(CH_3)_3SiO_{1/2}$ units and of $SiO_{4/2}$ units, purely organic resins, such as homo- or copolymers of acrylonitrile, of styrene, of vinyl chloride, or of propylene, where these purely organic resins, in particular copolymers of styrene and n-butyl acrylate, may have been produced in the presence of diorganopolysiloxanes having a Si-bonded hydroxy group in each of the terminal units, via free-radical polymerization of the monomers mentioned, corrosion inhibitors, oxidation inhibitors, heat stabilizers, solvents, agents affecting electrical properties, for example conductive black, flame retardants, light stabilizers, and agents to prolong skinning time, for example silanes having Si—C-bonded mercaptoalkyl radicals, or else cell formers, e.g. azodicarbonamide. Coupling agents may also be added.

The RTV1 alkoxy compositions preferably comprise fillers. Examples of fillers are non-reinforcing fillers, i.e. fillers whose BET surface area is up to 50 $m^2/g$, for example chalks with a carboxylic acid coating, quartz, diatomaceous earth, calcium silicate, zirconium silicate, zeolite, metal oxide powders such as aluminum oxides, titanium oxides, iron oxides, or zinc oxides, or mixed oxides of these, barium sulfate, calcium carbonate, gypsum, silicon nitride, silicon carbide, boron nitride, powdered glass, and powdered plastic, for example polyacrylonitrile powders; reinforcing fillers, i.e. fillers whose BET surface area is more than 50 $m^2/g$, for example fumed silica, precipitated silica, carbon black such as furnace black and acetylene black, and silicon/aluminum mixed oxides of high BET surface area; fibrous fillers such as asbestos, and also synthetic fibers.

The fillers mentioned may have been hydrophobicized, for example through treatment with organosilanes or organosiloxanes with stearic acid, or through etherification of hydroxy groups to give alkoxy groups. Use may be made of one type of filler, or a mixture of two or more fillers may be used.

If reinforcing silica is used as sole filler, transparent RTV1 alkoxy compositions can be prepared.

The RTV1 alkoxy compositions preferably comprise at least 2% by weight, in particular at least 5% by weight, and preferably at most 40% by weight, in particular at most 15% by weight, of filler.

Examples of plasticizers which may be used are alkyl aromatics, or dimethylpolysiloxanes which have end-capping by trimethylsiloxy groups and are liquid at room temperature.

Aminoalkyl-functional silanes are preferably present as coupling agents. These promote the formation of the tin catalyst. Preference is given to silanes of the general formula (X).

A-$(CH_2)_3$—Si$(OR^{15})_3$ (X), where
A is $NH_2$, NH—$CH_2CH_2NH_2$, NHR, and glycidoxy, and $R^{15}$ is as defined for R.

γ-aminopropyltriethoxysilane is particularly preferred as coupling agent.

The RTV1 alkoxy compositions preferably comprise from 0.5 to 5% by weight, in particular at most 3% by weight, of coupling agents.

The invention also provides a process for increasing the storage stability of compositions crosslinkable with elimination of alcohols from alkoxysilyl end groups to give elastomers, in which a tin catalyst is added to the compositions.

The compositions comprising a tin catalyst have excellent suitability, for example, as sealing compositions for joints, where these include vertical joints, and similar cavities whose gap width is, for example, from 10 to 40 mm, e.g. in buildings, in vehicles used on land or water, and in aircraft, or as adhesives or putties, e.g. in window construction, and also, for example, for the production of protective coverings or of elastomeric moldings, and also for the insulation of electrical or electronic apparatus.

In the general formulae (I) to (X), all of the radicals A, L, M, X, Y, R, $R^1$ to $R^{15}$, and also all of the indices b, c, d, f, g, m, n, o, p, r, and $\mu$ are independent of one another and may be identical or different.

In all of the formulae, the silicon atom is tetravalent, as is the tin atom, and the phosphorus atom is pentavalent. For the purposes of the present invention, the term organopolysiloxanes is intended to encompass dimeric, oligomeric, and polymeric siloxanes.

In the examples described below, all of the percentage parts given are based on weight, unless otherwise stated, and all of the viscosities are based on a temperature of 25° C. Unless otherwise stated, the examples below are carried out at the pressure of the ambient atmosphere, i.e. at about 1000 hPa, and room temperature, i.e. about 20° C, or at a temperature which becomes established when the reactants are combined at room temperature, with no additional heating or cooling.

Storage stability is determined on the basis of vulcanization of the RTV1 alkoxy compositions ("compounds") to give elastomers, as a function of storage time. The aging of the "compounds" is accelerated by storage at 50° C and 100° C., respectively.

EXAMPLES

Example 1

A reaction product of 1.0 g of dibutyltin diacetate and 2.0 g of tetraethoxysilane is treated with 1.5 g of tributyl phosphate, and the mixture is studied by NMR spectroscopy. In the $^{119}$Sn NMR spectrum, a marked high-field shift of the signal is observed and is attributable to complex formation, while the $^{31}$P NMR spectrum indicates that no P—O—C bonds are cleaved.

Example 2

55.4 parts by weight of a polydimethylsiloxane having —OSi(OCH$_3$)$_2$(CH$_3$) end groups, having a viscosity of 80,000 mPas, are mixed with 31.2 parts by weight of a polydimethylsiloxane having —OSi(CH$_3$)$_3$ end groups (viscosity 100 mPas), and 4.0 parts by weight of methyltrimethoxysilane, in a planetary-gear mixer which can operate in vacuo, water being excluded. 8.0 parts by weight of fumed silica are then incorporated, as are finally 0.8 part by weight of the mixture prepared in example 1. After homogenization in vacuo, the "compounds" is drawn off into moisture-proof packs. The result is listed in Table 1.

Examples 3–5

55.4 parts by weight of a polydimethylsiloxane having —Osi(OCH$_3$)$_2$(CH$_3$) end groups having a viscosity of 80,000 mPas are mixed with 31.2 parts by weight of a polydimethylsiloxane having —OSi(CH$_3$)$_3$ end groups (viscosity 100 mPas), and 4.0 parts by weight of methyltrimethoxysilane, and 1.0 part by weight of phosphoric ester in a planetary-gear mixer which can operate in vacuo, water being excluded. 8.0 parts by weight of fumed silica are then incorporated, as are finally 0.4 part by weight of a tin catalyst (reaction product prepared from 4 parts of tetraethoxysilane with 2.2 parts of dibutyltin diacetate). After homogenization in vacuo, the "compound" is drawn off into moisture-proof packs. The phosphoric esters used, and the results, are listed in Table 1.

Comparative Example 6 (Non-inventive)

The procedure is as in examples 2–5, except that no phosphoric ester is added. The results are listed in table 1. While the "compounds" with phosphoric ester addition vulcanize, with no addition a rubber is not obtained. These examples show the suppression of the undesired equilibration process.

TABLE 1

| P = O compound | | Vulcanization after 1 d 100° C. | Vulcanization after 2 weeks 50° C. |
|---|---|---|---|
| Example 2 | Product from example 1 | good | good |
| Example 3 | Wacker stabilizer S45 (polyglycol ether phosphate) | good | good |
| Example 4 | Fyrol FR-2*⁾ | good | good |
| Example 5 | Tripiperidino-phosphine oxide | good | good |
| Comparative example 6 | — | none | none |

*⁾phosphoric triester from Akzo Nobel Chemicals GmbH

Example 7

55.4 parts by weight of a polydimethylsiloxane having —OSi(OCH$_3$)$_2$(CH$_3$) end groups, having a viscosity of 80,000 mPas, are mixed with 31.2 parts by weight of a polydimethylsiloxane having —OSi(CH$_3$)$_3$ end groups (viscosity 100 mPas), and 4.0 parts by weight of methyltrimethoxysilane in a planetary-gear mixer which can operate in vacuo, water being excluded. 8.0 parts by weight of fumed silica are then incorporated, as are finally 0.8 part by weight of the mixture prepared in example 1. After homogenization in vacuo, the "compound" is drawn off into moisture-proof packs. The skinning times (ST) are listed in table 2.

Examples 8–9

54.4 parts by weight of a polydimethylsiloxane having —OSi(OCH$_3$)$_2$(CH$_3$) end groups having a viscosity of 80,000 mPas, are mixed with 30.5 parts by weight of a polydimethylsiloxane having —Si(OCH$_3$)$_3$ end groups (viscosity 100 mPas), 4.0 parts by weight of methyltrimethoxysilane, 1.8 parts by weight of a polydimethylsiloxane containing 3-aminopropyl groups, and 1.0 part by weight of phosphoric ester in a planetary-gear mixer which can operate in vacuo, water being excluded. 7.9 parts by weight of fumed silica are then incorporated, as are finally 0.4 parts by weight of a tin catalyst (reaction product prepared from 4 parts of tetraethoxysilane with 2.2 parts of dibutyltin diacetate). After homogenization in vacuo, the "compound" is drawn off into moisture-proof packs. The phosphoric esters used, and the skinning times (ST) are listed in table 2.

Comparative Example 10 (Non-inventive)

The procedure is as in examples 7–9, except that no phosphoric ester is added. The result is listed in table 2.

TABLE 2

| | Phosphoric ester | ST after 1 d RT [min] | Vulcanization after 1 d RT [min] | ST after 1 week 50° C. [min] | Vulcanization after 1 week 50° C. [min] |
|---|---|---|---|---|---|
| Example 7 | product from example 1 | 20 | good | 20 | good |
| Example 8 | Wacker stabilizer S45 (polyglycol ether phosphate) | 15 | good | 15 | good |
| Example 9 | Fyrol FR-2*⁾ | 25 | good | 30 | good |
| Comparative example 10 | — | 30 | good | >180 | none |

*⁾Phosphoric triester from Akzo Nobel Chemicals GmbH

What is claimed is:

1. In a composition which is crosslinkable with elimination of alcohols from alkoxysilyl end groups to give elastomers in the presence of a catalyst, the improvement comprising selecting as at least one catalyst, a tin compound having a coordination number of 5 or 6 and coordinately bonded to a P=O group of a phosphorus compound, the tin compound prepared by reaction of a phosphorus compound having a P=O group, of the formulae (I), (III):

$$O=PR^1{}_m(OR^2)_n(OH)_{3-m-n} \qquad (I),$$

where n is 3, where m is 0, n is 0, 1, or 2, where m is 1, 2, or 3, m+n is 1, 2, or 3, R$^1$ and R$^2$ are C$_1$–C$_{30}$-hydrocarbon radicals, optionally substituted by hydroxy, halogen, or cyano radicals, or radicals of the general formula (II):

$$-[(CR^3{}_2)_b-O]_c(CR^4{}_2)_d\text{-L-M} \qquad (II),$$

where

R$^3$ and R$^4$ are independently selected from hydrogen radicals, methyl radicals, and hydroxy radicals, b and d are 2 or 3, c is an integer from 1 to 15, L each independently is a radical selected from the group consisting of —O—, —COO—, —OOC—, —CONR$^5$—, —NR$^6$CO—, and —CO—, R$^5$ and R$^6$ each independently are a hydrogen radical or a C$_1$–C$_{10}$-alkyl radical, and M is a monovalent C$_1$–C$_{20}$-hydrocarbon radical, optionally substituted with hydroxy, fluoro, chloro, bromo, C$_{10}$–C$_{10}$-alkoxyalkyl, or cyano groups, with the proviso that on each carbon atom only one of the radicals R$^3$ and R$^4$ may be a hydroxyl radical;

$$O=PR^7{}_o(NR^8{}_2)_p(OR^9)_{3-o-p} \qquad (III),$$

where

R$^7$ is as defined for R$^1$,

R$^8$ is as defined for R$^1$, and where it is possible for the radicals R$^8$ to be bonded to one another, $R^9$ is as defined for $R^1$, or is hydrogen, o is 0, 1, or 2, p is 1, 2, or 3, and o+p is 1, 2, or 3, or condensates or hydrolysates of compounds of the formulae (I), (III) having one or more P—O—P bonds;

with an organic tin compound of formula (IV):

$$R^{10}{}_{4-r}SnX_r \qquad (IV),$$

an organic tin compound of the formula (V):

$$R^{10}{}_2SnY \qquad (V),$$

an organic tin compound of the formula (VI):

$$R^{10}{}_3SnY_{1/2} \qquad (VI),$$

an organic tin compound of the formula (VII):

$$R^{10}SnY_{3/2} \qquad (VII),$$

where $R^{10}$ is $C_1$–$C_{20}$-hydrocarbon radicals, optionally substituted by halogen radicals or by cyano radicals, X is halo, —OH, —$OR^{10}$, —$SR^{10}$, —$OOCR^{10}$, —$NR^{10}{}_2$, —$NHR^{10}$, —$OSiR^{10}{}_3$ or —$OSi(OR^{10})_3$, Y is O or S, and r is the values 1, 2, or 3.

2. The composition of claim 1, comprising compounds having alkoxysilyl end groups selected from the group consisting of at least two of organopolysiloxanes, polyethers, polyesters, polyurethanes, polyureas, and copolymers of organopolysiloxanes, polyethers, polyesters, polyurethanes and polyureas.

3. The composition of claim 1, which is a single-component organopolysiloxane composition crosslinkable with elimination of alcohols to give elastomers.

4. The composition of claim 3, which comprises from 0.01 to 3% by weight of tin catalyst.

5. The composition of claim 4, which further comprises at least one aminoalkyl-functional silane as a coupling agent.

6. The composition of claim 3, which further comprises at least one aminoalkyl-functional silane as a coupling agent.

7. The composition of claim 1, wherein said catalyst comprises the reaction product of a phosphorus compound of the formula (I) and a tin compound of the formula (IV).

8. The composition of claim 1, wherein said tin compound is the reaction product of one or more of dibutyltin diacetate, dibutyltin dilaurate, and dibutyltin oxide with an alkoxysilane.

9. The composition of claim 8, wherein said phosphorus compound is a triester of orthophosphoric acid.

10. The composition of claim 8, wherein said alkoxysilane comprises tetraethoxysilane.

11. A process for increasing the storage stability of compositions crosslinkable with elimination of alcohols from alkoxysilyl end groups to give elastomers, comprising adding a tin catalyst comprising tin having a coordination number of 5 or 6, tin coordinately bonded to a P=O group, and said tin catalyst prepared by reacting a phosphorus compound of the formulae (I), (III):

$$O=PR^1{}_m(OR^2)_n(OH)_{3-m-n} \qquad (I),$$

where n is 3, where m is 0, n is 0, 1, or 2, where m is 1, 2, or 3, m+n is 1, 2, or 3, $R^1$ and $R^2$ are $C_1$–$C_{30}$-hydrocarbon radicals, optionally substituted by hydroxy, halogen, or cyano radicals, or radicals of the general formula (II):

$$-[(CR^3{}_2)_b-O]_c(CR^4{}_2)_d-L-M \qquad (II),$$

where $R^3$ and $R^4$ are independently selected from hydrogen radicals, methyl radicals, and hydroxy radicals, b and d are 2 or 3, c is an integer from 1 to 15, L each independently is a radical selected from the group consisting of —O—, —COO—, —OOC—, —$CONR^5$—, —$NR^6CO$—, and —CO—, $R^5$ and $R^6$ each independently are a hydrogen radical or a $C_1$–$C_{10}$-alkyl radical, and M is a monovalent $C_1$–$C_{20}$-hydrocarbon radical, optionally substituted with hydroxy, fluoro, chloro, bromo, $C_1$–$C_{10}$-alkoxyalkyl, or cyano groups, with the proviso that on each carbon atom only one of the radicals $R^3$ and $R^4$ may be a hydroxyl radical;

$$O=PR^7{}_o(NR^8{}_2)_p(OR^9)_{3-o-p} \qquad (III),$$

where $R^7$ is as defined for $R^1$, $R^8$ is as defined for $R^1$, and where it is possible for the radicals $R^8$ to be bonded to one another, $R^9$ is as defined for $R^1$, or is hydrogen, o is 0, 1, or 2, p is 1, 2, or 3, and o+p is 1, 2, or 3, or condensates or hydrolysates of compounds of the formulae (I), (III) having one or more P—O—P bonds;

with an organic tin compound formula (IV):

$$R^{10}{}_{4-r}SnX_r \qquad (IV),$$

an organic tin compound of the general formula (V):

$$R^{10}{}_2SnY \qquad (V),$$

an organic tin compound of the formula (VI):

$$R^{10}{}_3SnY_{1/2} \qquad (VI),$$

an organic tin compound of the formula (VII):

$$R^{10}SnY_{3/2} \qquad (VII),$$

where $R^{10}$ is $C_1$–$C_{20}$-hydrocarbon radicals, optionally substituted by halogen radicals or by cyano radicals, X is halo, —OH, —$OR^{10}$, —$SR^{10}$, —$OOCR^{10}$, —$NR^{10}{}_2$, —$NHR^{10}$, —$OSiR^{10}{}_3$ or —$OSi(OR^{10})_3$, Y is O or S, and r is 1, 2, or 3.

* * * * *

UNITED STATES PATENT AND TRADEMARK OFFICE
CERTIFICATE OF CORRECTION

PATENT NO. : 6,951,912 B2
DATED : October 4, 2005
INVENTOR(S) : Uwe Scheim et al.

It is certified that error appears in the above-identified patent and that said Letters Patent is hereby corrected as shown below:

Column 8,
Line 57, delete "$C_{10}$-$C_{10}$" and insert -- $C_1$-$C_{10}$ --.

Signed and Sealed this

Seventeenth Day of January, 2006

JON W. DUDAS
*Director of the United States Patent and Trademark Office*